Jan. 26, 1960

W. D. COLLIER 2,922,609

ADJUSTABLE MOUNT

Filed June 3, 1958

INVENTOR.
WILLIAM D. COLLIER
BY Charles H. Wagner
ATTORNEYS

INVENTOR.
WILLIAM D. COLLIER
BY
ATTORNEYS

United States Patent Office 2,922,609
Patented Jan. 26, 1960

2,922,609

ADJUSTABLE MOUNT

William D. Collier, Albuquerque, N. Mex.

Application June 3, 1958, Serial No. 739,634

4 Claims. (Cl. 248—179)

(Granted under Title 35, U.S. Code (1952), sec. 266)

The invention described herein may be manufactured and used by or for the United States Government for governmental purposes without payment to me of any royalty thereon.

This invention relates generally to adjustable mounts and more particularly to mounts for cameras and other instruments which may require adjustments in both elevation and azimuth and has for an object the provision of means permitting a full 360° adjustment in azimuth and a 90° adjustment in elevation or any combined adjustment thereof.

A further object includes a three part structure in which an intermediate member provides the mounting means for the azimuth and elevation adjustments and a single adjustable means is employed for holding the structure in any of its adjusted positions.

A further object is the provision of a three part adjustable mount which is provided with a single means for holding the element together, constituting means for determining the degree of "holding friction" between the elements during adjustment.

A further object is the provision of a simple and unique adjustable camera mount which can be manufactured economically and requires a minimum amount of machining.

A further object includes a removable mounting means for the camera or other instrument whereby the camera and removable mounting means can be easily removed or quickly replaced with a minimum amount of labor and time, in which the camera is held securely in precise relation to the mount when the mounting means is in place thereon.

Other objects and advantages of the invention will become apparent from the following description and accompanying drawings in which like reference characters refer to like parts in the several figures of the drawings.

Figure 1:
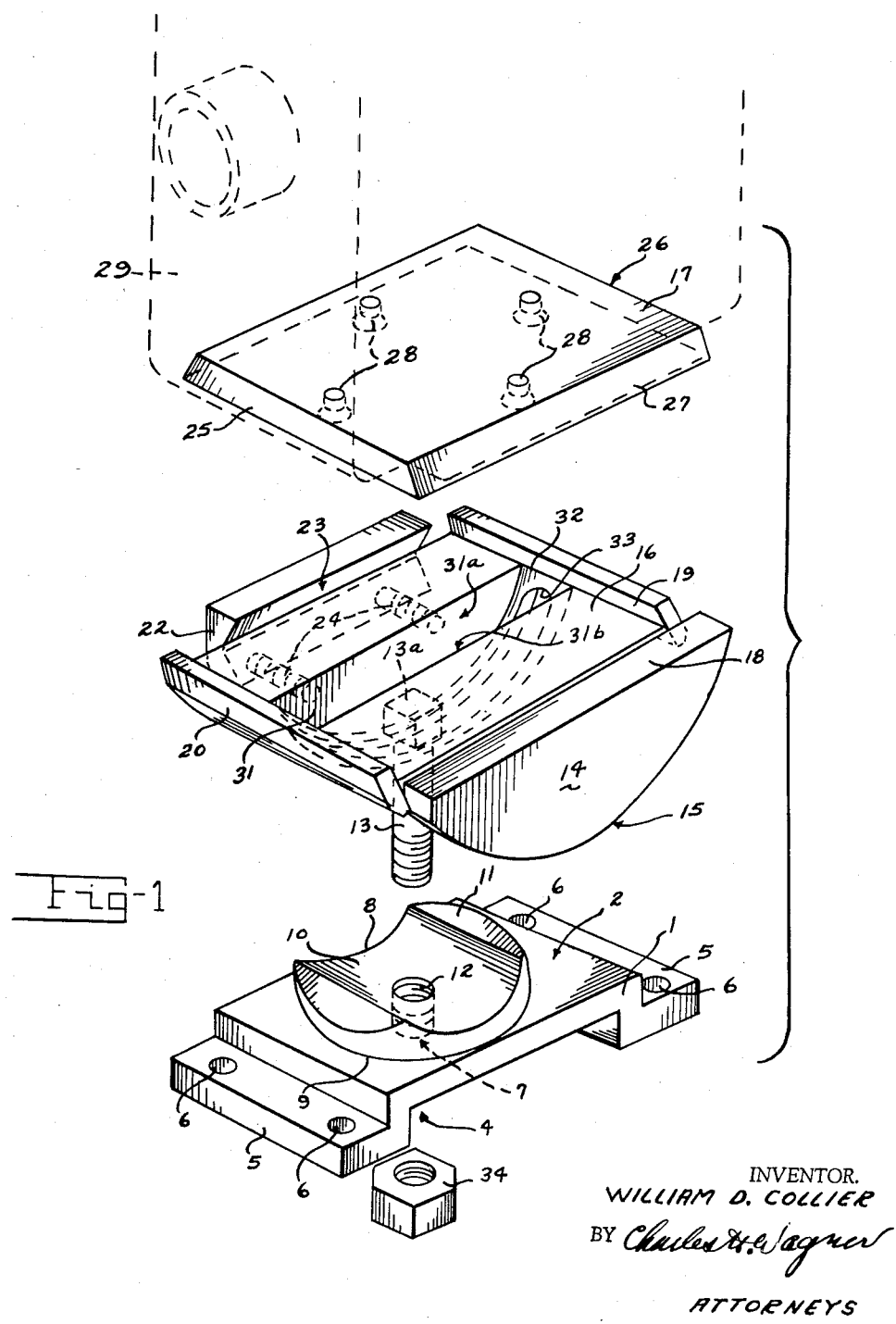
Figure 1 is an exploded view of the several parts of the improved adjustable camera or instrument mount.
Figure 2:
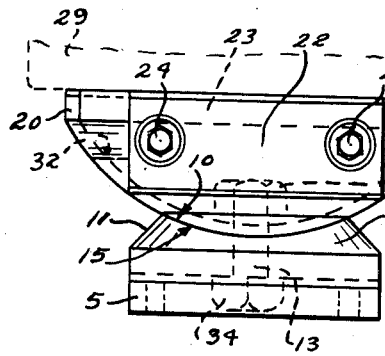
Figure 2 is an end elevation of the mount showing the lower portion of a camera in phantom mounted thereon.
Figure 3:
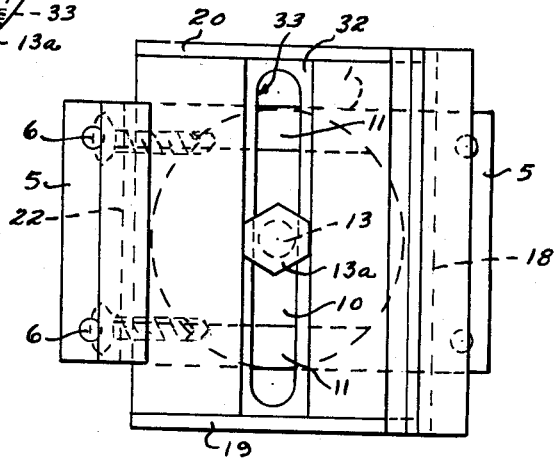
Figure 3 is a top plan view of the device shown in Figure 2 but with the camera mounting plate omitted.

Referring to the drawings my improved adjustable mount is disclosed in the exploded view in Figure 1 and in assembled conditions in Figures 2 to 5 comprising a base plate 1 having a flat or plane upper surface 2, preferably of rectangular shape and having an opening 4 in the lower side thereof, the plate 1 having side flanges or feet 5 formed with openings 6 for receiving fastening means such as screws or bolts for mounting the plate on a suitable support, for instance a "tripod." The center of the plate is formed with circular opening 7 therethrough from the flat surface 2 into the space 4.

Mounted on the base plate 1, on the flat surface 2 thereof is a circular cradle disk member 8 having a lower or flat or plane surface 9 disposed in frictional contact with the surface 2.

The cradle disk 8 is formed with a cylindrical depression 10 extending diametrically across its upper surface as shown in Figure 1 and is beveled at 11 from the opposite side edges of the depression. The disk 8 is formed with a pivot opening or aperture 12 extending therethrough from the bottom of the depression 10 to the lower flat surface 9 in alignment with pivot opening 7 through the base plate 1, the openings 7 and 12 being substantially the same size and circular for the reception of a pivot or clamping member 13 in the form of a bolt, which fits the opening and permits free rotative adjustment of the cradle disk on the base plate in a plane parallel to the plane surfaces aforesaid.

The reference numeral 14 denotes the instrument supporting cradle member having a lower cylindrical surface 15 which is complemental in curvature to the cylindrical depression 10 and extends from end to end, preferably beyond the ends of the circular depression. The radii of curvature of the circular depression 10 and the cylindrical surface 15 are the same so as to dispose the surface 15 in frictional contact with the surface 10 and the arc of curvature of the surface 15 is preferably greater than 90° disposed in a plane which is perpendicular to the surfaces 2 and 9, passing through the centers of the openings 6 and 12. This arrangement affords a tilting adjustment of the cradle member through an elevation angle of 90° and an azimuth adjustment of the cradle member 14 with the cradle disk 8 on the plane surface 2 through an angle of 360°.

The cradle member 14 is formed with an upper rectangular surface 16 formed to support a rectangular instrument mounting plate 17.

The upper surface 16 is formed with an inwardly beveled overhanging flange 18 at one end and outwardly projecting flanges 19 and 21 having straight sides, a removable inwardly beveled flange plate 22 having an overhanging flange portion 23 is adjustably secured on the open end of the cradle member 14 by clamping screws 24.

Figure 4:
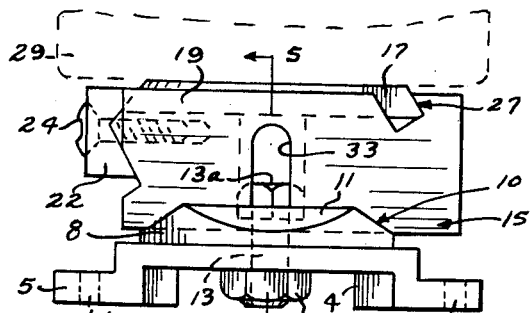
Figure 4 is a side elevation of the adjustable mount shown in Figures 2 and 3, the lower portion of a camera being shown in phantom.
Figure 5:
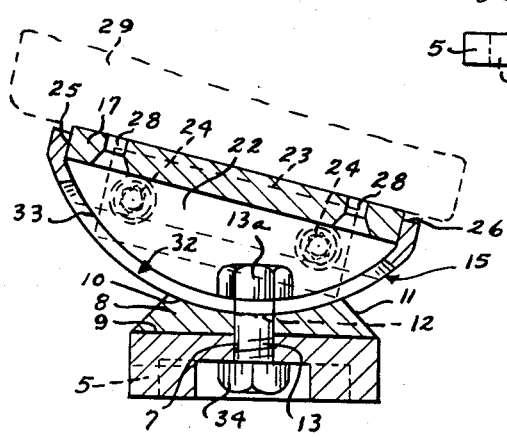
Figure 5 is a transverse vertical sectional view taken about on line 5—5 of Figure 4.

The instrument mounting plate 17 is rectangular to fit the opening between the flanges 18, 19, 20 and 21 having two sides 25 and 26 disposed to nicely fit between the flanges 19 and 20 and outwardly beveled opposite edges 27 disposed to engage the beveled flange 18 and the beveled portion 23 of the clamping plate 22 respectively for retaining the instrument mounting plate on the cradle member in precise fixed relation as shown in Figures 4 and 5.

The plate 17 as shown in Figure 1 is preferably provided with fastener openings 28 preferably countersunk at the underside of the plate to receive screw fasteners for securing an instrument such as a camera, depicted schematically at 29, to the instrument supporting plate.

The cradle member 14 is formed with a transverse depression or recess 31 intermediate its ends having an inner cylindrically curved surface 32 formed concentric to the axis of the outer cylindrically curved surface and extending from the side flange 19 to the side flange 20 through an arc exceeding 90°.

An elongated slot 33 extends substantially the length of the inner cylindrically curved surface 32 in a plane perpendicular to the axis of curvature of the surface 15 and having a width substantially equal throughout its length to the diameter of said pivot openings 7 and 12 for the clamping means 13 to pass through. The clamping means, as shown, is a bolt having an abutment head 13a disposed to engage said inner curved surface 32 at opposite sides of the slot 33, the head 13a preferably having opposite flat surfaces for engagement with the opposite sides 31ᵃ and 31ᵇ of the recess 31 to prevent rotation of the clamping bolt 13 in the cradle member 14, but permitting the longitudinal adjustment of the position of the slot 33 and tilting in elevation of the cradle member on the cradle disk 8 through an arc of 90°.

A clamping member 34 in the form of a nut is threadably secured on the lower end of the bolt 13 in contact with the lower surface of the base plate 1 for drawing the members 1, 8 and 14 in suitable frictional contact, the opening 4 permitting adjustment of the nut 34 to adjust the frictional contact indicated.

The cradle disk may be "sand blasted" all over to roughen the contacting surfaces 9 and 10 to increase the frictional contact, also a spring washer may be provided under the head 13ᵃ or above the nut 34 for providing suitable spring tension for holding the frictional contact parts in predetermined frictional contact with each other during adjustment.

Assuming a camera 29 or other instrument is fixed on the plate 17 and the screws 24 are loosened the plate 17 is inserted on the upper surface 16 of the cradle member 14 between the side flanges 19 and 20 with the bevel flange 27 engaging under the overhanding bevel flange 18. The clamping plate 22 is now clamped tight to engage the overhanging flange portion 23 over the bevel end 28 and draw the instrument mounting plate down tight against the supporting surface 16.

Adjustment in azimuth of the cradle member rotates the cradle disk 8 on the plane surface 2 of the cradle disk while tilting of the camera in elevation rocks the cradle member 14 on the cradle disk 8. As shown the camera can be rotated through full 360° in azimuth and can be tilted in elevation through 90° the tilting movement being limited by the engagement of the clamping bolt 13 with the opposite ends of the elongated slot 33.

Having thus described one illustrative embodiment of the invention, it is obvious that various minor changes in size and shape and arrangement of parts may be resorted to without departing from the spirit and scope of the invention as defined in the appended claims.

I claim:

1. An adjustable mount comprising a base plate having an upper plane surface and formed with an opening extending through the central portion of said plate perpendicular to said plane surface, a cradle disk mounted on said base plate having a lower plane surface in frictional contact with the plane surface of said base plate, said cradle disk having an upper cylindrically curved depression formed therein extending diametrically from side to side, said cradle disk having an opening extending centrally therethrough from the bottom of said depression to said plane surface in alignment with the first mentioned opening, a cradle member having a cylindrically curved lower surface complementally curved to fit and frictionally engage said curved depression, and formed with an elongated slot therethrough intermediate the opposite ends of the cylindrical surface in register with both of the aforesaid openings in a plane perpendicular to the axis of said cylindrical surface, adjustable pivot means extending through the aforesaid two openings and said elongated slot for retaining said plane surfaces of said base plate and said cradle disk and the cylindrically curved surfaces of said disk and said cradle member in predetermined frictional contact respectively with each other, whereby the cradle disk is rotatable on the base plate in a plane parallel to said plane surfaces and said cradle member is tiltable on said cradle disk in a plane passing through said openings perpendicular to said plane surfaces.

2. An adjustable instrument mount rotatable 360° in azimuth and substantially 90° in elevation comprising a base plate having an upper flat supporting surface adapted to be disposed in a horizontal plane, means for mounting said base plate on a support, said base plate having a central pivot opening therethrough perpendicular to said plane surface, a circular cradle disk having a lower plane surface disposed in frictional contact with the plane surface aforesaid and formed with a circular cradle depression in its upper surface extending from side to side with an axis parallel to said plane surfaces, said cradle disk having a pivot opening therethrough disposed in alignment with the first mentioned opening perpendicular to said plane surfaces, an instrument mounting cradle member having a lower cylindrically curved surface complementary to said cylindrical depression in frictional contact with the surface of said cylindrical depression, said cradle member having an upper surface formed with a transverse recess having a cylindrically curved bottom concentric to the axis of curvature of said cylindrical surface perpendicular to said axis and extending through an arc greater than 90°, an elongated pivot receiving slot in the base of said transverse recess extending substantially from end to end therethrough to said curved surface in registration with the pivot opening aforesaid, an adjustable pivot member extending through said openings and said slot having abutment means at one end engaging the lower surface of said base plate and abutment means at its opposite end engaging the base of said transverse recess at opposite sides of said slot.

3. Apparatus as claimed in claim 2 including an instrument mounting plate receiving recess formed in the upper surface of said cradle member, an instrument mounting plate fitted in said mounting plate recess and means on said cradle member for releasably securing said instrument mounting plate in said instrument mounting plate recess.

4. Apparatus as set forth in claim 2 in which the upper surface of said cradle member is formed with a rectangular opening having an overhanging flange at one end and positioning flanges at opposite sides, an instrument mounting plate fitting said rectangular opening having a retaining edge at one end disposed to seat under said overhanging flange and a similar flange at its opposite end, and a clamping member carried by said cradle member having an overhanging flange disposed to engage said similar flange to retain said instrument mounting plate in said rectangular opening.

References Cited in the file of this patent

UNITED STATES PATENTS

| 388,788 | Prescott | Aug. 28, 1888 |
| 1,794,726 | Mitchell | Mar. 3, 1931 |

FOREIGN PATENTS

| 365,861 | Germany | Dec. 29, 1922 |